April 12, 1927.
H. I. MORRIS
1,624,272
APPARATUS FOR WINDING MATERIAL
Filed Sept. 30, 1924
2 Sheets-Sheet 2
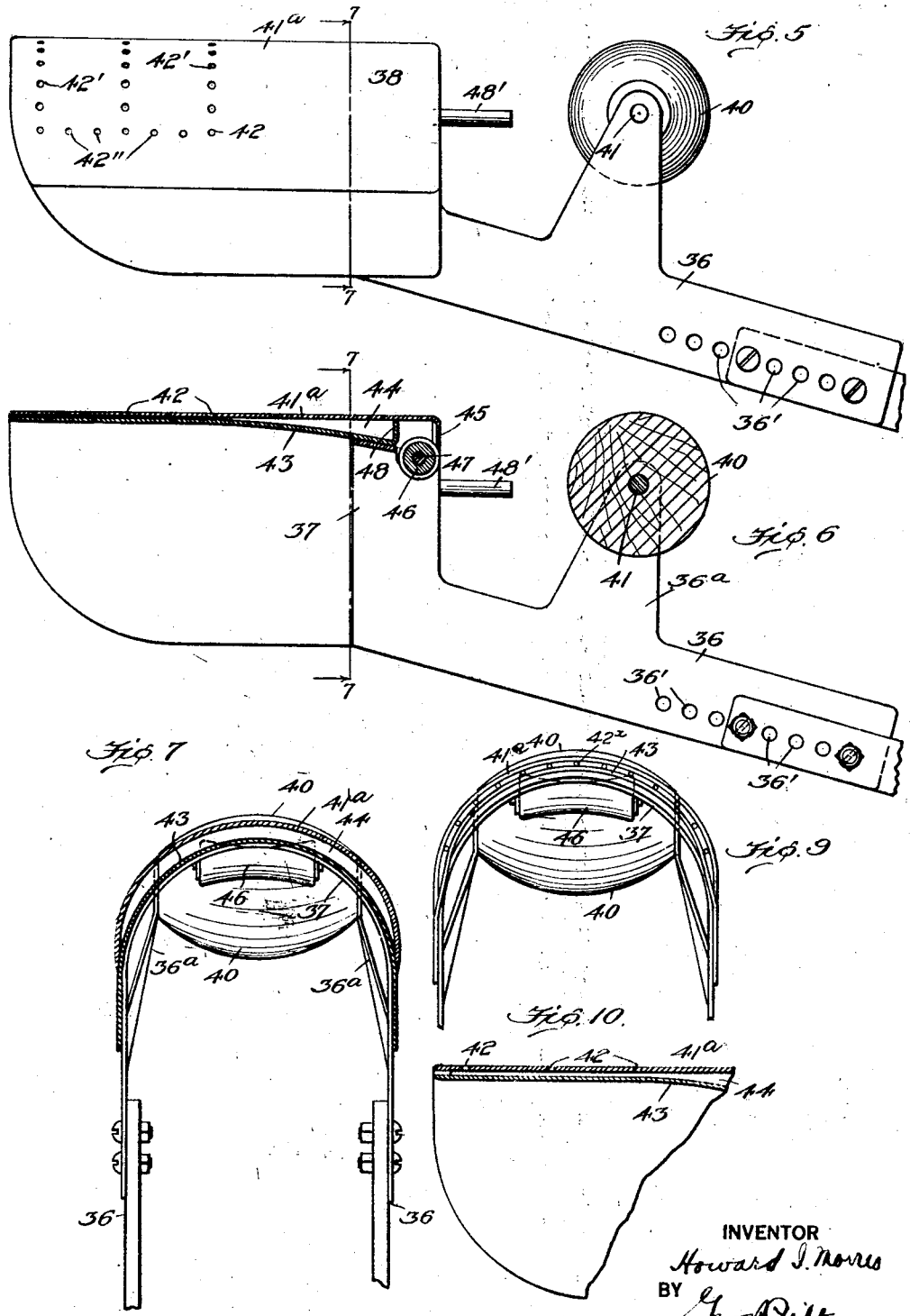
INVENTOR
Howard I. Morris
BY
Geo. A. Pitts
ATTORNEY Patented Apr. 12, 1927.

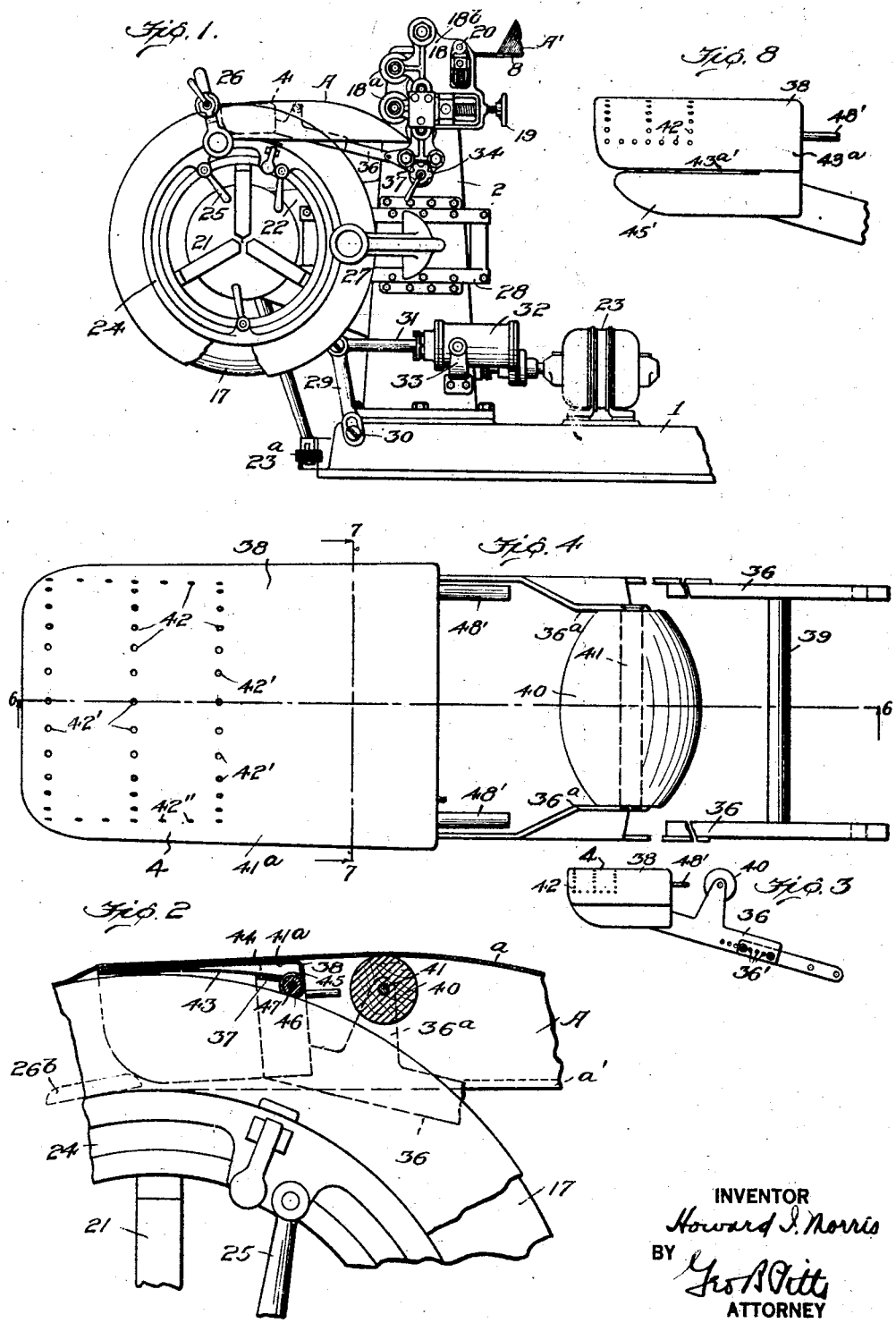

1,624,272

UNITED STATES PATENT OFFICE.

HOWARD I. MORRIS, OF LAKEWOOD, OHIO, ASSIGNOR TO THE CORD TIRE MACHINE COMPANY, OF CLEVELAND, OHIO, A CORPORATION OF ARIZONA.

APPARATUS FOR WINDING MATERIAL.

Application filed September 30, 1924. Serial No. 740,750.

This invention relates to a machine for making tire carcasses of the type wherein a strip of web of material is wound on a rotatable member. While I have shown and in practice have used my invention in connection with a rotatable member that is curved transversely, it will be understood that it is not limited for use or association with a forming member of this shape.

One object of the invention is to provide an improved guide device for the material, whereby it may be delivered to the rotatable member in a rapid manner without any distortion or wrinkling.

Another object of the invention is to provide an improved device for delivering material to a rotatable member capable of guiding the material with minimum friction and without causing any distortion thereof, whereby the material may be delivered in a rapid manner for winding on a member at any desired speed.

A further object of the invention is to provide a relatively simple form of guide device, whereby it may be readily made and used without danger of obstructing the feed of the material.

Other objects of the invention will be apparent to those skilled in the art to which my invention relates from the following description taken in connection with the accompanying drawings.

Fig. 1 is a fragmentary view of a machine for making tire carcasses having a guide device embodying my invention.

Fig. 2 is a fragmentary view, enlarged, showing the guide device in section and a portion of the forming member in side elevation.

Fig. 3 is a side elevation of the guide device.

Fig. 4 is a top plan view of the device, enlarged.

Fig. 5 is a side elevation of the device, enlarged.

Fig. 6 is a section of line 6—6 of Fig. 4.

Fig. 7 is a section on the line 7—7 of Figs. 4, 5 and 6.

Fig. 8 is a side view of a slightly modified guide device embodying my invention.

Fig. 9 illustrates a further modification of the invention, and

Fig. 10 is a fragmentary longitudinal section of the same.

I have, for illustrative purposes, shown my invention as applied to a machine for making tire carcasses wherein the material of which the carcass is made, is continuously fabricated into a web and the latter is convolutely wound on a forming member to provide the carcass with the desired number of plies of material. This machine, a portion of which is shown in Fig. 1 of the accompanying drawings, forms the subject matter of my co-pending application, Serial No. 705,654.

Referring to Fig. 1, 1 indicates a base of any desired construction for supporting the operating parts of the mechanism. As fully disclosed in the aforesaid application, the mechanisms of the complete machine operate first to supply and fabricate the various materials which are united into a web of the composite type, indicated at A, having a body portion $a$ and beads $a'$ extending along its opposite longitudinal sides or edges and then to wind such composite web onto a rotatable member a predetermined number of times to form an annular multi-ply member. Where the annular member is a tire carcass, I prefer to use a rotatable member having a transversely curved surface, whereby the material may be shaped into final form as the winding operation proceeds. Such shaped member is ordinarily called a core, which term is employed herein without limiting the invention to this type of rotatable member.

As the present invention relates to the feeding and delivery of the composite material to the rotatable member and winding of the material thereon, only that portion of the machine relating to the supply of the composite web and making of the carcass is shown. 2 indicates a standard rising from the base, at one end thereof and supporting at one side of the standard a mechanism 18 for consolidating the materials shown at A' and for feeding the resulting composite web A to a guide device or shoe, indicated as an entirety at 4. The mechanism 18 preferably comprises a plurality of rolls $18^a$, certain of which are driven, rotatably mounted at their inner ends in bearings provided on the standard 2, the outer ends of the rolls being rotatably mounted in a plate $18^b$ supported in spaced relation to the standard 2 and a pair of rolls 20 interposed between the rolls 18ª and the free end of the platen 8.

19 indicates devices for adjusting one of the rolls 18ª to increase the pressure thereof on the materials, to complete the consolidation thereof.

The core 17 is removably mounted upon a chuck 21, which in turn is supported upon and driven by a shaft rotatably mounted in bearings in a housing 22, which extends outwardly from the standard 2. The shaft for the chuck is driven through suitable driving connections (not shown) by a motor 23 mounted on the base 1. The chuck shaft is connected to and disconnected from the driven element of the driving connections in any desired manner, preferably by a clutch, and such connection and disconnection may be controlled by a foot pedal 23ª.

24 indicates bead rings (only one being shown) arranged to be clamped by devices 25 to the opposite sides of the core 17.

26 indicates as an entirety bead rolling down devices preferably mounted upon an arm pivoted at its inner end to the standard 2. The rolling down devices include rollers 26ᵇ which engage the bead portions a' of the web (see Fig. 2) to press them against the sides of the core 17. The construction of these devices and the mounting thereof will form the subject matter of a separate co-pending application.

27 indicates as an entirety a mechanism for rolling down the body portion a of the web A as it is wound on the core 17. The rolling down mechanism 27 is slidably mounted in guides 28 carried by the standard 2 so as to move substantially in a radial direction toward and from the core 17. The rolling down mechanism 27 is connected to the free end of a lever 29, which is slidably and pivotally connected at its lower end to the base 1, as shown at 30. Intermediate its ends, the lever 29 is connected to a rod 31 which carries at its inner end a piston mounted in a cylinder 32. The cylinder 32 is provided with valved controlled ports for the admission of compressed air or other medium, whereby the rod 31 may be operated to swing the lever 29 and thus move the rolling down mechanism 27 into and out of operating position. The cylinder 32 is preferably trunnioned between the standard 2 and a bracket 33, so that it may accommodate itself to the position of the lever 29 as the latter is operated.

34 indicates a valve mechanism for controlling the compressed air to the bead rolling down devices 26 and the rolling down devices and cylinder of the body rolling down mechanism 27.

The body rolling down mechanism 27 forms the subject matter of a separate co-pending application for which reason further description thereof will not be necessary.

As shown in Fig. 1, the guide device or shoe 4 is disposed between the consolidating and feeding mechanism 18 and the core 17 and operates to guide the body portion a of the web A to the latter so that the bead portion a' thereof may engage the sides of the core adjacent the bead rings thereof simultaneously or prior to the engagement of the body portion of the web with the core.

Of the guide device 4, 36 indicates a pair of spaced arms pivotally mounted at their inner ends upon lugs 37' (only one being shown) supported by the standard 2 and plate 18ᵇ. The arms 36 preferably extend toward the core 17 in substantially parallel relation, each arm preferably comprising two strips adjustably connected at their adjacent ends in the manner to be later set forth. At their outer ends the arms 36 are connected by a transverse member 37, which preferably has a shape corresponding approximately to the cross-sectional shape of the member 17 on which the web A is to be wound. Where the rotatable member or core is curved transversely, the transverse member 37 is curved, preferably into U-shape. The purpose of the transverse member 37 is to connect the outer ends of the arms 36 together and also to support a guide element 38, over which the web A slides, in operative relation to the periphery of the core 17, as will be later set forth. 39 indicates a rod connected at its opposite ends to the inner ends of the arms 36 so as to maintain them in spaced relationship. The adjacent ends of the strips constituting each arm overlap each other so that they may be rigidly secured together in any desired manner, but preferably in a manner which permits of an adjustment of the strips endwise, whereby the outer strips may be moved relative to the inner strips. For this purpose, each strip is formed with a plurality of openings 36' which register with the openings of the other strip, thereby permitting one or more screws to be inserted through the openings and provided with nuts to clamp the plates together in face to face engagement.

40 indicates a roller rotatably mounted on the arms 36 and between the consolidating mechanism 18, or that roll 18ª thereof from which the web A is delivered, and the curved member 37. The roll 40 is loosely mounted on a shaft 41 supported at its opposite ends in standards 36ª. The standards 36ª may be integrally connected with the arms 36.

The guide element 38 projects outwardly beyond the curved member or section 37 and is adapted to extend over a portion of the core 17 so as to support the body portion a of the web and guide it into contact with the core 17 in the manner to be later set forth.

Of the guide element 38, 41ª indicates a shoe or plate over which the web A slides, formed with a plurality of openings 42 through which a fluid, such as air under pressure is continuously discharged to provide a relatively thin air film between the plate and the web and thus prevent sticking of the material and to reduce or substantially eliminate all friction between them. 43 indicates a wall disposed below and spaced from the plate 41ª to provide a fluid chamber 44 to supply the fluid to the openings 42. The plate 41ª and wall 43 are curved transversely, the opposite side edges of the plate resting on and being secured to the wall by soldering or otherwise to hold them in spaced relation and to seal the chamber along its sides. The forward portion of the wall 43 preferably lies relatively close to the plate 41ª and its front or free edge is inclined upwardly so that it may be secured thereto. By this arrangement, the free end of the guide plate is supported at a relatively short distance above the core 17 or the outer ply of material wound thereon, thereby permitting the web A to slide onto the core 17 of the material previously applied thereto substantially in a plane tangential to the point of contact. At its rear end the plate 41ª is bent downwardly, as shown at 45, to form the rear wall of the chamber 44 and secured in an air or liquid tight manner to the wall 43. The wall 43 is rigidly secured to the transverse member 37 in any desired manner, preferably by soldering or welding. 46 indicates a roller loosely mounted on the underside of the guide device 38 in position to ride on the core 17 as it rotates and the material wound thereon, and serving to support the outer end of the guide device. By this arrangement it will be seen that the free or delivery end of the guide plate 41ª has the same relation to the surface of the core 17 and each successive ply of material, so that no matter how many convolutions are wound on the core, the guide device operates uniformly to deliver the web A thereto, thereby preventing distortion and tending to secure uniformity of tension on the cords throughout all the plies of the material. The supporting roller 46 is preferably mounted in a recess formed by cutting away the transverse number 37. The shaft 47 for the roller 46 may be supported in openings formed in integral lugs depending from the side edges of the cut-away. To permit of this arrangement, the metal of the wall 43 is struck up along the edges of the cut-away as shown at 48 to form side walls for the chamber 44 around the cut-away.

The openings 42 may be arranged in any desired manner, but preferably extend over an area transversely of the plate 41ª to either side of the longitudinal axis of the web A. I preferably provide three transverse rows of openings 42' and connect their opposite ends by longitudinal rows 42''.

45' indicates wings disposed at either side of the guide element 38 and depending therefrom. The purpose of the wings 45' is to guide the bead portions a' and lateral sides of the web A to the core 17. The wings 45' are preferably provided by extending the opposite longitudinal sides of the wall 43 downwardly, which wall being formed of relatively thin guaged resilient metal provide flexible guide wings which are flexed inwardly by the web A as it conforms to the shape of the core in feeding thereto. Where greater flexibility is desired, the metal of the wall may be slitted along one or more longitudinal lines, one example of such form of construction being shown in Fig. 8, where the wall 43ª is slit at 43ª' from its front edge rearwardly.

At one side, the walls of the chamber 44 have connected to them a tubular section 48', to which a pipe, preferably of flexible character is connected, such pipe leading to a source of fluid supply to conduct the fluid (such as air under pressure) to the chamber 44 for delivery through the openings 42. A suitable valve may be provided to regulate the flow of the fluid to the chamber 44.

The air flowing through the openings 42 will contact with the lower face of the web A and thus form over the plate 41ª (or a portion thereof) a film. This film will not only prevent all sticking of the web A to the plate, but on the other hand will serve as an anti-friction means so that the web will readily slide over and be guided by the plate, permitting it to be fed to the core 17 at any desired speed.

As the web A rides over the front edge of the plate 41 and is deflected downwardly on to the core 17, very little air is permitted to escape along the front edge of the plate; accordingly, the air backs up on the plate and forms a film over substantially its entire surface, so that but a relatively small number of discharge openings 42 near the forward or delivery end of the shoe is required.

When it is desired to supply fluid along or adjacent the delivery edge of the guide element to eliminate friction on the web A at this point, I may form a plurality of openings 42ˣ along the front edge of the guide element, these openings being preferably drilled in and through the metal of the walls 41ª, 43, into the chamber 44. The compressed air flowing out of the openings 42ˣ impinges against the underside of the web and serves to slightly raise it off the edge of the guide element so that little if any friction results as the web feeds onto the core 17.

The guide element 38 is supported in position to permit feed of the bead portions a' in a substantial tangential plane from the delivery feed roll 18ᵃ to that point on the bead rings 24 substantially opposite or slightly rearward of the bead rolling down devices, while supporting and guiding the body portion of the web A out of contact with the core 17 or the previously applied material until or following the rolling down of the bead portions a', thereby insuring the uniform laying of the web on the core at all points transversely without danger of wrinkling or distortion.

From the foregoing description it will be seen that I provide a shoe adapted to so deliver all portions of the material to the winding member that winding thereon may be effected with uniformity and smoothness and at any desired speed. In winding a carcass from material of the character herein referred to, the beads are wound helically in side by side relation and must be progressively rolled in position at opposite sides of the core prior to or at the same time that the body portion of the material is applied thereto. In the operation of my shoe I am enabled to guide and support the body portion of the material out of contact with the core until or following the engagement of the bead rolling down devices with the beads to press them against the sides of the core adjacent the bead rings.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination with a supply means for material and a rotating member on which the material is wound, of a guide device for the material between said supply means and said member having openings in its surface, and means for supplying a fluid for discharge through said openings.

2. In apparatus of the class described, the combination with a supply means for material and a rotating member on which the material is wound, of a guide element supported at its inner end on the support for said supply means and adapted to engage said member at or adjacent its outer end, the guide wall of said element adjacent its outer end being formed with a plurality of openings, and means for supplying a fluid to said openings for delivery therethrough.

3. In apparatus of the class described, the combination with a supply means for material and a rotatable member on which the material is wound, of a guide device for the material between said supply means and said member, said device comprising a wall formed with a plurality of openings and a chamber for a fluid under pressure for supplying fluid to said openings, and a fluid connection from a source of supply connected to said chamber.

4. In apparatus of the class described, the combination with a source of material supply and a member on which the material is wound, of a guide element for the material formed with an opening in its surface to supply fluid between such surface and the under side of the material, and means for supplying fluid under pressure to said opening.

5. In apparatus of the class described, the combination with a source of material supply and a member on which the material is wound, of a guide element for the material formed with an opening in its surface to supply fluid between such surface and the under side of the material, a supporting element for the material disposed between said guide element and said material supply means, and means for supplying fluid under pressure to said opening.

6. In apparatus of the class described, the combination with a source of material supply and a member on which the material is wound, of a guide element for the material formed with an opening in its surface to supply fluid between such surface and the under side of the material, means for adjusting said guide device relative to said member, and means for supplying fluid under pressure to said opening.

7. In apparatus of the class described, the combination with a supply means for material and a rotatable member on which the material is wound, of a pair of arms pivoted on the support for said supply means, a guide device for the material supported at the outer ends of said arms, said device comprising a wall formed with an opening and a chamber for a fluid under pressure for supplying fluid to said opening, and a fluid connection from a source of supply to said chamber.

8. In apparatus of the class described, the combination with means for supplying material and a member on which the material is to be wound, of a guide element extending over a portion of said member for guiding the material thereto, said element comprising a wall corresponding in shape transversely approximately to the shape of said member, and means for supplying fluid under pressure between said wall and the underside of the material.

9. In apparatus of the class described, the combination with means for supplying material and a member on which the material is to be wound, of a guide element extending over a portion of said member for guiding the material thereto, said element comprising a wall corresponding in shape transversely approximately to the shape of said member, means for supplying fluid under pressure between said wall and the underside of the material, and wings depending from the opposite sides of said wall.

10. In apparatus of the class described, the combination with means for supplying material and a member on which the material is to be wound, of a guide element extending over a portion of said member for guiding the material thereto, said element comprising a wall corresponding in shape transversely approximately to the shape of said member, means for supplying fluid under pressure between said wall and the underside of the material, and flexible wings depending from the opposite sides of said wall.

11. In apparatus of the class described, the combination with means for supplying material and a member on which the material is to be wound, of a guide element extending over a portion of said member for guiding the material thereto, said element comprising a wall corresponding in shape transversely approximately to the shape of said member, means for supplying fluid under pressure between said wall and the underside of the material, and resilient wings depending from the opposite sides of said wall.

12. In apparatus of the class described, the combination with means for supplying material and a rotatable member on which the material is to be wound, of a guide device pivotally connected to the support for said supply means and comprising a guide element extending over a portion of said member and a roller engaging said member for supporting the free or delivery end of said guide element in a fixed relation to the surface of said member and each convolution of material wound thereon, and means for supplying fluid under pressure between said element and the underside of the material.

13. In apparatus of the class described, the combination with means for supplying material and a rotatable member on which the material is to be wound, of a guide device pivotally connected to the support for said supply means and comprising a guide element extending over a portion of said member and formed with an opening within the area traversed by the material as it is guided to said member and a roller engaging said member for supporting the free or delivery end of said guide element in a fixed relation to the surface of said member and each convolution of material wound thereon, and means for supplying fluid under pressure to said opening.

14. In apparatus of the class described, the combination with means for supplying material and a rotatable member on which the material is to be wound, of a guide device pivotally connected to the support for said supply means and comprising a guide element extending over a portion of said member and a roller engaging said member for supporting the free or delivery end of said guide element in a fixed relation to the surface of said member and each convolution of material wound thereon, means for supplying fluid under pressure between said element and the underside of the material, and a roller interposed between said material supply means and said guide element.

15. In apparatus of the class described, the combination with means for supplying material and a rotatable member on which the material is to be wound, of a guide device pivotally connected to the support for said supply means and comprising a guide element extending over a portion of said member and a roller engaging said member for supporting the free or delivery end of said guide element in a fixed relation to the surface of said member and each convolution of material wound thereon, means for supplying fluid under pressure between said element and the underside of the material, a roller interposed between said material supply means and said guide element, and means for adjusting said element relative to the support for said material supply means.

16. In apparatus of the class described, the combination with a supply means for a web, a rotating core on which the web is wound, and devices engaging the side edges of the web to roll them against the sides of said core, of a transversely curved guide element for the web between said supply means and said core and having an opening in its surface, means for supplying a fluid for discharge through said opening, flexible wings depending from the opposite sides of said element, and means for supporting said element in operative relation to said member and each convolution of material wound thereon.

17. In apparatus of the class described, the combination with a supply means for a web and a rotating core on which the web is wound, of a guide element supported at its inner end on the support for said supply means and adapted to engage the upper portion of said core at or adjacent its outer end, the guide wall of said element being formed with an opening adjacent its outer end, and means for supplying a fluid to said opening for discharge therethrough.

18. In apparatus of the class described, the combination with means for supplying material and a rotatable member on which the material is wound, of a guide element mounted in operative relation to said member, and means for supplying fluid between said element and the underside of the material to eliminate friction therebetween.

19. In apparatus of the class described, the combination with means for supplying material and a rotatable member on which the material is wound, of a guide element mounted in operative relation to said member, and means for supplying fluid between said element and the underside of the material to eliminate friction therebetween, the material engaging the edge of said element as it moves onto said member to prevent the escape of the fluid, whereby the fluid backs up underneath the material.

20. In apparatus of the class described, the combination with a rotatable member on which material winds and a source of supply for the material, of a guide device associated with said rotatable member, and means for supplying fluid between the upper surface of said device and the under side of the material and also against the under side of the material transversely thereof in front of said guide device.

21. In apparatus of the class described, the combination with a rotatable member on which material is wound and a source of supply for the material, of a guide device associated with said rotatable member and comprising a fluid chamber, the upper wall of which serves to guide the material onto said rotatable member, the said upper wall and front wall of said chamber being formed with openings respectively through which the fluid is discharged to form a film between the material and the walls of said chamber, whereby friction is substantially eliminated, and means for supplying fluid to said chamber.

In testimony whereof, I have hereunto subscribed my name.

HOWARD I. MORRIS.